United States Patent [19]

Lynn

[11] Patent Number: 5,511,399
[45] Date of Patent: Apr. 30, 1996

[54] MOTORCYCLE THROTTLE CLAMP

[76] Inventor: Todd E. Lynn, 35687 Rolf, Westland, Mich. 48185

[21] Appl. No.: 420,146

[22] Filed: Apr. 11, 1995

[51] Int. Cl.[6] .................................................. B62H 5/18
[52] U.S. Cl. ................................. 70/19; 70/203; 70/212; 70/228; 70/233; 74/489; 180/219; 188/24.18
[58] Field of Search ..................... 70/209, 254, 242–244, 70/236, 237, 163, 166–169, 177, 180, 14, 19, 198–203, 211, 212, 233, 228; 180/219; 74/489; 188/24.18

[56] References Cited

U.S. PATENT DOCUMENTS

| | | | |
|---|---|---|---|
| 677,907 | 7/1901 | Vandeleur | 70/203 |
| 1,343,870 | 6/1920 | James | 70/199 |
| 4,426,861 | 1/1984 | Chillis | 70/203 X |
| 5,347,835 | 9/1994 | Dewey | 70/202 |
| 5,375,916 | 12/1994 | Cook | 70/177 X |

*Primary Examiner*—Lloyd A. Gall

[57] ABSTRACT

A motorcycle throttle clamp comprised of a pair of rectangular blocks having a semi-circular indentation on outer surfaces thereof. The semi-circular indentations are adapted to engage a round tubular handlebar of a motorcycle. The pair of rectangular blocks have a locking component. The locking component receives a motorcycle throttle therein to prevent the throttle from being operated.

3 Claims, 3 Drawing Sheets

MOTORCYCLE THROTTLE CLAMP

BACKGROUND OF THE INVENTION

1. Field of the Invention

The present invention relates to a motorcycle throttle clamp and more particularly pertains to preventing operation of a throttle mounted on handlebars of vehicles, such as motorcycles and all terrain vehicles with a motorcycle throttle clamp.

2. Description of the Prior Art

The use of throttle controls is known in the prior art. More specifically, throttle controls heretofore devised and utilized for the purpose of providing controlling means, such as cruise control are known to consist basically of familiar, expected and obvious structural configurations, notwithstanding the myriad of designs encompassed by the crowded prior art which have been developed for the fulfillment of countless objectives and requirements.

By way of example, U.S. Pat. No. 5,333,515 to Schneider discloses a motorcycle throttle control to hold a motorcycle throttle in a predetermined position.

U.S. Pat. No. 4,286,700 to Morris et al. discloses a motorcycle throttle control to lock the throttle grip at the positioned desired.

U.S. Pat. No. 4,133,193 to Sanada et al. discloses a throttle grip locking device for motorcycles.

U.S. Pat. No. 4,019,402 to Leonheart discloses a motorcycle throttle twist-grip control.

U.S. Pat. No. 3,918,323 to Prager discloses a motorcycle throttle-grip protector.

U.S. Pat. No. 3,782,219 to Beck et al. discloses a friction lock for outboard motor throttle hand grip.

While these devices fulfill their respective, particular objective and requirements, the aforementioned patents do not describe a motorcycle throttle clamp for preventing operation of a throttle mounted on handlebars of vehicles, such as motorcycles and all terrain vehicles.

In this respect, the motorcycle throttle clamp according to the present invention substantially departs from the conventional concepts and designs of the prior art, and in doing so provides an apparatus primarily developed for the purpose of preventing operation of a throttle mounted on handlebars of vehicles, such as motorcycles and all terrain vehicles.

Therefore, it can be appreciated that there exists a continuing need for a new and improved motorcycle throttle clamp which can be used for preventing operation of a throttle mounted on handlebars of vehicles, such as motorcycles and all terrain vehicles. In this regard, the present invention substantially fulfills this need.

SUMMARY OF THE INVENTION

In the view of the foregoing disadvantages inherent in the known types of throttle controls now present in the prior art, the present invention provides an improved motorcycle throttle clamp. As such, the general purpose of the present invention, which will be described subsequently in greater detail, is to provide a new and improved motorcycle throttle clamp and method which has all the advantages of the prior art and none of the disadvantages.

To attain this, the present invention essentially comprises an upper generally rectangular block having a first portion and a second portion. The first portion has an upper surface and a lower surface. The lower surface has a semi-circular indentation therein. The semi-circular indentation is adapted to engage a round tubular handlebar of a motorcycle. The second portion has an upper surface and a lower surface. The second portion has a first locking component. The first locking component has a pair of apertures formed through the lower surface of the second portion. The first locking component has a key-hole in the upper surface of the second portion for the receipt of a key for orienting the first locking component between a locking orientation and an unlocking orientation. The device contains a lower generally rectangular block having a first portion and a second portion. The first portion has an upper surface and a lower surface. The upper surface has a semi-circular indentation therein. The semi-circular indentation is adapted to engage a round tubular handlebar of a motorcycle. The second portion has an upper surface and a lower surface. The upper surface of the second portion has a second locking component. The second locking component is formed as notches on a pair of upwardly extending shafts from the upper surface of the second portion. The pair of shafts receive a motorcycle throttle therebetween and are adjustably positionable through the pair of apertures of the first locking component of the upper rectangular block with the notches effecting the coupling between the first and second locking component.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved motorcycle throttle clamp which has all the advantages of the prior art throttle controls and none of the disadvantages.

It is another object of the present invention to provide a new and improved motorcycle throttle clamp which may be easily and efficiently manufactured and marketed.

It is a further object of the present invention to provide a new and improved motorcycle throttle clamp which is of durable and reliable construction.

An even further object of the present invention is to provide a new and improved motorcycle throttle clamp which is susceptible of a low cost of manufacture with regard to both materials and labor, and which accordingly is then susceptible of low prices of sale to the consuming public, thereby making such a motorcycle throttle clamp economically available to the buying public.

Still yet another object of the present invention is to provide a new and improved motorcycle throttle clamp which provides in the apparatuses and methods of the prior art some of the advantages thereof, while simultaneously overcoming some of the disadvantages normally associated therewith.

Even still another object of the present invention is to provide a new and improved motorcycle throttle clamp for preventing operation of a throttle mounted on handlebars of vehicles, such as motorcycles and all terrain vehicles.

Lastly, it is an object of the present invention to provide a new and improved motorcycle throttle clamp comprised of a pair of rectangular blocks having a semi-circular indentation on outer surfaces thereof. The semi-circular indentations are adapted to engage a round tubular handlebar of a motorcycle. The pair of rectangular blocks have a locking component. The locking component receives a motorcycle throttle therein to prevent the throttle from being operated.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts through the various Figures.

DESCRIPTION OF THE PREFERRED EMBODIMENT

Figure 1:
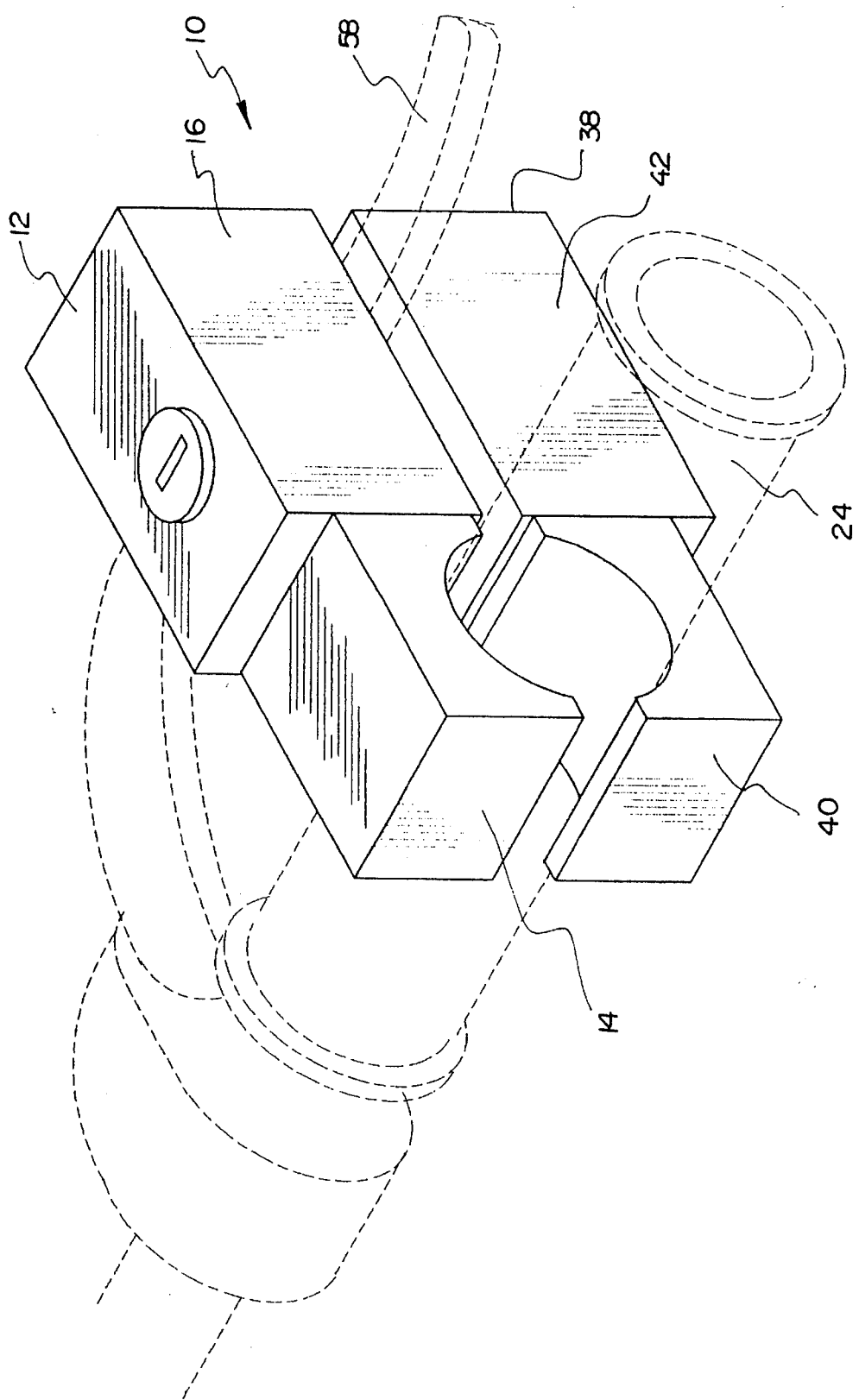
FIG. 1 is a perspective view of the preferred embodiment of the motorcycle throttle clamp constructed in accordance with the principles of the present invention.
Figure 2:
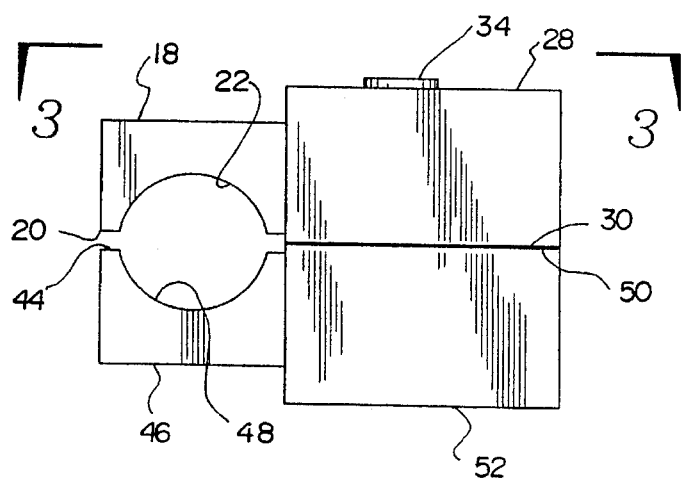
FIG. 2 is a front elevation view of the present invention.
Figure 3:
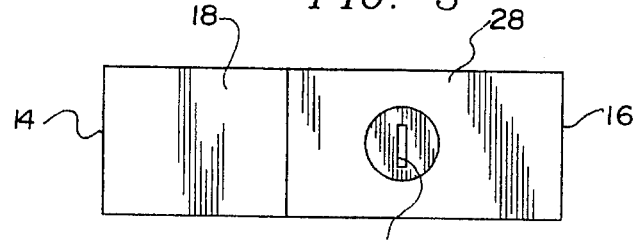
FIG. 3 is a view as taken along line 3—3 of FIG. 2.
Figure 4:
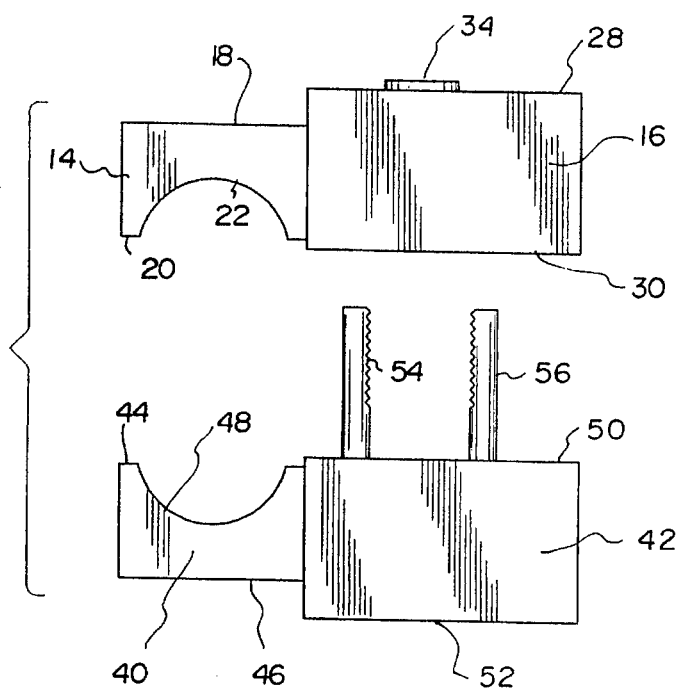
FIG. 4 is an exploded side view of the present invention.
Figure 5:
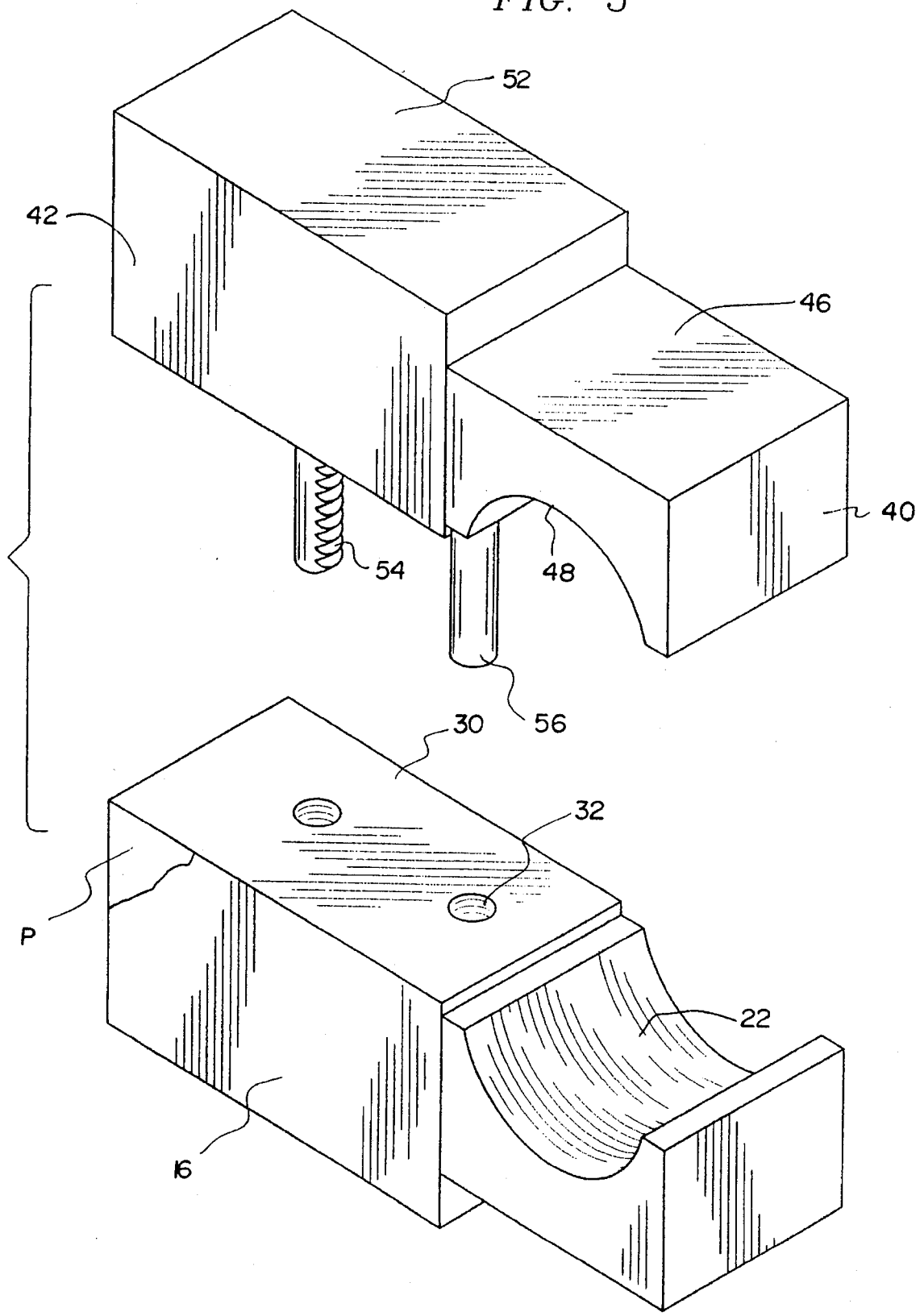
FIG. 5 is an exploded perspective view of the present invention.

With reference now to the drawings, and in particular, to FIGS. 1–5 thereof, the preferred embodiment of the new and improved motorcycle throttle clamp embodying the principles and concepts of the present invention and generally designated by the reference number 10 will be described.

Specifically, it will be noted in the various Figures that the device relates to a new and improved motorcycle throttle clamp for preventing operation of a throttle mounted on handlebars of vehicles, such as motorcycles and all terrain vehicles. In its broadest context, the device consists of an upper generally rectangular block, and a lower generally rectangular block.

The device 10 contains an upper generally rectangular block 12 having a first portion 14 and a second portion 16. The first portion 14 has an upper surface 18 and a lower surface 20. The lower surface 20 has a semi-circular indentation 22 therein. The semi-circular indentation 22 is adapted to engage a round tubular handlebar 24 of a motorcycle. The second portion 16 has an upper surface 28 and a lower surface 30. The second portion 16 has a first locking component. The first locking component has a pair of apertures 32 formed through the lower surface 30 of the second portion 16. The first locking component has a key-hole 34 in the upper surface 28 of the second portion 16 for the receipt of a key for orienting the first locking component between a locking orientation and an unlocking orientation.

The device 10 contains a lower generally rectangular block 38 having a first portion 40 and a second portion 42. The first portion 40 has an upper surface 44 and a lower surface 46. The upper surface 44 has a semi-circular indentation 48 therein. The semi-circular indentation 48 is adapted to engage a round tubular handlebar 24 of a motorcycle. The second portion 42 has an upper surface 50 and a lower surface 52. The upper surface 50 of the second portion 42 has a second locking component. The second locking component is formed as notches 54 on a pair of upwardly extending shafts 56 from the upper surface 50 of the second portion 42. The pair of shafts 56 receive a motorcycle throttle 58 therebetween and are adjustably positionable through the pair of apertures 32 of the first locking component of the upper rectangular block 12 with the notches 54 effecting the coupling between the first and second locking component. The notches 54 allow the user to utilize the device 10 to provide different gripping pressures. The device 10 could also be positioned over a starter switch thereby making the motorcycle or other vehicle less desirable for an attempted theft.

The present invention is a clamp that prevents the operation of a throttle 58 and other types of controls mounted on the handlebars 24 of vehicles, such as motorcycles and all terrain vehicles.

The clamp consists of two rectangular blocks 12,38 with semi-circular indentations 22,48 in each at the outer portion, fitting snugly against the round tubular material from which handlebars 24 are constructed. A tie rod-type arrangement is on the other end of the two blocks 12,38 to lock the unit in place so it cannot be rotated. A suitable locking mechanism holds the clamp in place. Different configurations could be designed for specific vehicles and the control being immobilized. Hardened steel is the preferred material for the rectangular blocks 12,38, because it resists the use of cutters or saws. Plating P may be added to minimize the effects of corrosion, ensure long life and maintain attractive appearance.

The shape of the indentations 22,48 prevent the rotation of the throttle 58 control, or the use of the thumb or finger to operate the throttle 58. If necessary, the clamp can be affixed to other permanent equipment on the vehicle, discouraging easy removal.

Current motorcycles are very expensive, and often become targets for thieves. This locking clamp can be applied or removed rapidly, and stores in a small place for the utmost convenience. More important is the confidence it provides to the user that the vehicle will not be stolen.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modification and changes will readily occur to those skilled in the art, it is not desired to limit the invention to the exact construction and operation shown and described, and accordingly, all suitable modification and equivalents may be resorted to, falling within the scope of the invention.

What is claimed as being new and desired to be protected by Letters Patent of the United States is as follows:

1. A motorcycle throttle clamp for preventing operation of a throttle mounted on handlebars of vehicles, such as motorcycles and all terrain vehicles comprising, in combination:

an upper block having a first rectangular portion and a second rectangular portion, the first portion having an upper surface and a lower surface, the lower surface having a semi-circular indentation therein, the semi-circular indentation adapted to engage a round tubular handlebar of a motorcycle, the second portion having an upper surface and a lower surface, the second portion having a first locking component, the first locking component having a pair of apertures formed through the lower surface of the second portion, the first locking component having a key-hole in the upper surface of the second portion for the receipt of a key for orienting the first locking component between a locking orientation and an unlocking orientation;

a lower block having a first rectangular portion and a second rectangular portion, the first portion having an upper surface and a lower surface, the upper surface having a semi-circular indentation therein, the semi-circular indentation adapted to engage a round tubular handlebar of a motorcycle, the second portion having an upper surface and a lower surface, the upper surface of the second portion having a second locking component, the second locking component formed as notches on a pair of shafts upwardly extending from the upper surface of the second portion, the pair of shafts defining a motorcycle throttle receiving means therebetween and adjustably positionable through the pair of apertures of the first locking component of the upper block with the notches effecting the coupling between the first and second locking component.

2. The clamp as described in claim 1 and further including wherein the upper block and the lower block are constructed of a hardened steel.

3. The clamp as described in claim 2 and further including wherein the upper block and the lower block having a protective plating material thereon to minimize effects of corrosion thereon.

* * * * *